United States Patent [19]

Sawada et al.

[11] Patent Number: 4,521,872
[45] Date of Patent: Jun. 4, 1985

[54] INSTRUCTION STORAGE

[75] Inventors: Hideo Sawada; Kiyoshi Yata, both of Hadano, Japan

[73] Assignee: Hitachi, Ltd., Tokyo, Japan

[21] Appl. No.: 327,118

[22] Filed: Dec. 3, 1981

[30] Foreign Application Priority Data

Dec. 10, 1980 [JP] Japan .............................. 55-173282

[51] Int. Cl.³ .......................................... G11C 13/00
[52] U.S. Cl. ..................................... 365/49; 365/189
[58] Field of Search .................................. 365/49, 189

[56] References Cited

U.S. PATENT DOCUMENTS 4,296,475 10/1981 Nederlof et al. ...................... 365/49

Primary Examiner—Terrell W. Fears
Attorney, Agent, or Firm—Antonelli, Terry & Wands

[57] ABSTRACT

An instruction storage for storing microinstructions or macroinstructions is disclosed. Each instruction word includes error check and correction bits to enable error correction when an error is detected, and a plurality of instructions are assembled from each instruction word.

11 Claims, 2 Drawing Figures

INSTRUCTION STORAGE

BACKGROUND OF THE INVENTION

The present invention relates to a control storage (CS) for storing a microprogram (MP) in a system for processing data under control of the microprogram.

As IC manufacturing technology has advanced, the integration factor for providing logic on a chip has been remarkably increased. The integration factor of an IC memory has particularly been increased. However, the reliability of the IC memory has not been increased at the same rate, but reliability per IC rather tends to be decreased. A high density IC is an important factor in compacting a product and the demand for high density is continuously growing. Accordingly, it is clearly important in the manufacture of a memory IC to utilize high density IC techniques while preventing a reduction in the reliability of the product.

As a method for preventing a reduction of the reliability, or even enhancing that reliability, it has been known to use a single bit error check and correction and a multiple-bit error check technique using a Hamming code. This error checking and correcting (ECC) technique has been used in main memories to prevent the reduction of or enhance the reliability of the high density IC memories provided as the main memories.

In a control storage (CS) for storing a microprogram (MP), the ECC technique has been rarely used because the IC memory used in the control storage CS is much more expensive than the IC memory used as the main memory because of the high speed requirement and the demand for reducing the capacity of the control storage CS is strong. Accordingly, it has been common to add parity bits which need a smaller number of bits than the check bits for the ECC technique.

However, in recent years, the microprogram not only executes the instruction words, but also executes particular routines in the program, which is done in firmware, and the number of steps of the microprogram has increased by the enhancement of maintenance and diagnosing functions. Accordingly, the required capacity of the control storage CS has been necessarily increasing. Consequently, higher speed and higher density IC memories are being used as the control storage CS. As a result, the reliability of the control storage CS has decreased and error detection by the use of a parity check routine cannot assure normal system operation because of increasing errors. Accordingly, the need for an error recovery method has become a continuing problem to be resolved.

Besides the ECC method, the known error recovery methods include a retry method for an intermittent error and a refresh method involving rewriting which makes use of a property inherent in the control storage CS that the content thereof is not variable. However, none of these methods is completely effective to detect a solid error and hence the complete recovery by the ECC method has been demanded.

SUMMARY OF THE INVENTION

It is an object of the present invention to provide an instruction storage capable of storing a large amount of instructions in a storage of small capacity.

In accordance with the present invention, each word stored in a storage unit has a first data field area including data for each of a plurality of instructions, a second data field area including data which is common to the plurality of instructions, and error check and correction bits for that word. An instruction designation unit for designating one of the instructions in the storage unit has a first designation field for designating one of the words in the storage unit and a second designation field for designating the first data field area. When an instruction word designated by the first designation field is read from the storage unit, an instruction word is formed from the read-out data based on the second data field area in the read-out word and those in the first data field area designated by the second designation field.

BRIEF DESCRIPTION OF THE DRAWINGS

An embodiment of this invention will now be described by way of example in conjunction with the accompanying drawings in which.

DETAILED DESCRIPTION OF A PREFERRED EMBODIMENT

Figure 1:
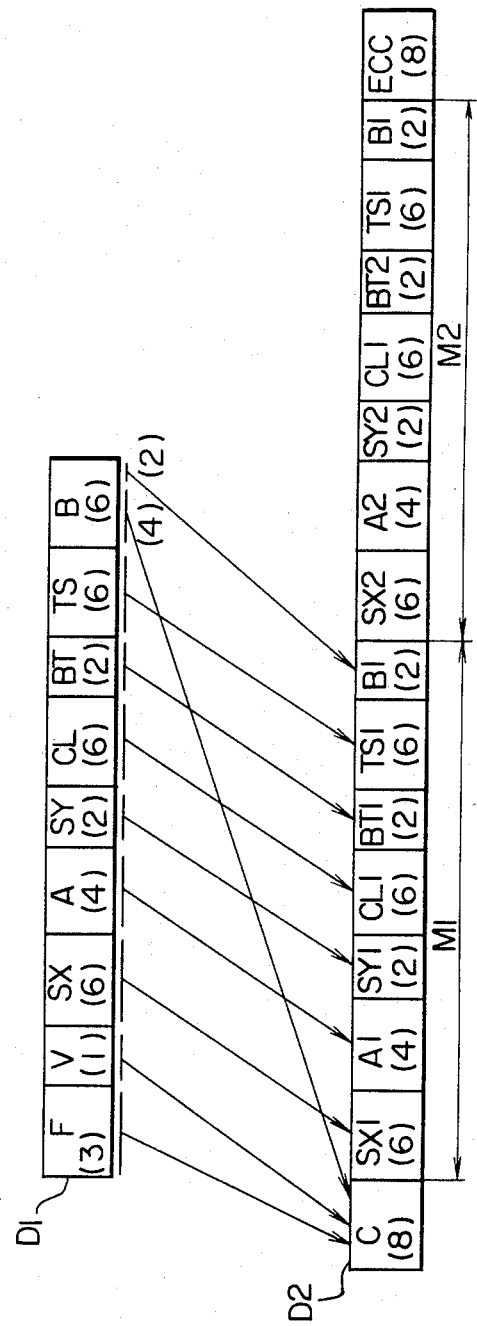
FIG. 1 is a diagram which shows the relationship between a microinstruction format and a word format in the control storage CS.

Referring to FIG. 1, the relationship between a microinstruction format and a word format in the control storage CS is shown. Numerals in parentheses indicate the numbers of bits. The microinstruction $D_1$ comprises 36 bits which are divided into fields as shown below.

(1) F . . . 3 bits. Designates a function of the microinstruction.
(2) V . . . 1 bit. Modifies the function.
(3) SX . . . 6 bits. Selects operation input data.
(4) A . . . 4 bits. Designates type of operation.
(5) SY . . . 2 bits. Selects operation input data.
(6) CL . . . 6 bits. Designates control for each function.
(7) BT . . . 2 bits. Designates type of branch of the microinstruction.
(8) TS . . . 6 bits. Designates type of test.
(9) B . . . 6 bits. Designates a branch-to address of the microinstruction.

The word $D_2$ in the control storage CS is formed in accordance with two microinstructions in the following manner. The microinstructions are, in general, independent from each other and can be used to control separately, but many of the separate microinstructions designate the same fields, particularly the fields F, V and B.

Thus, a total of eight bits comprising all bits of the field F and V of the microinstruction and the four bits of the field B are used in common for two microinstructions and those eight bits are set as the field C of the word $D_2$. A total of 28 bits comprising the bits of the fields SX, A, SY, CL, BT and TS which are inherent to the respective microinstructions and the two remaining bits of the field B are set for each of the microinstructions with numerals 1 and 2 being added after the symbol M to provide the sectors M1 and M2. Eight check bits ECC are added for the ECC operation for a total of 64 bits, so that the word of the control storage CS comprises 72 bits.

Figure 2:
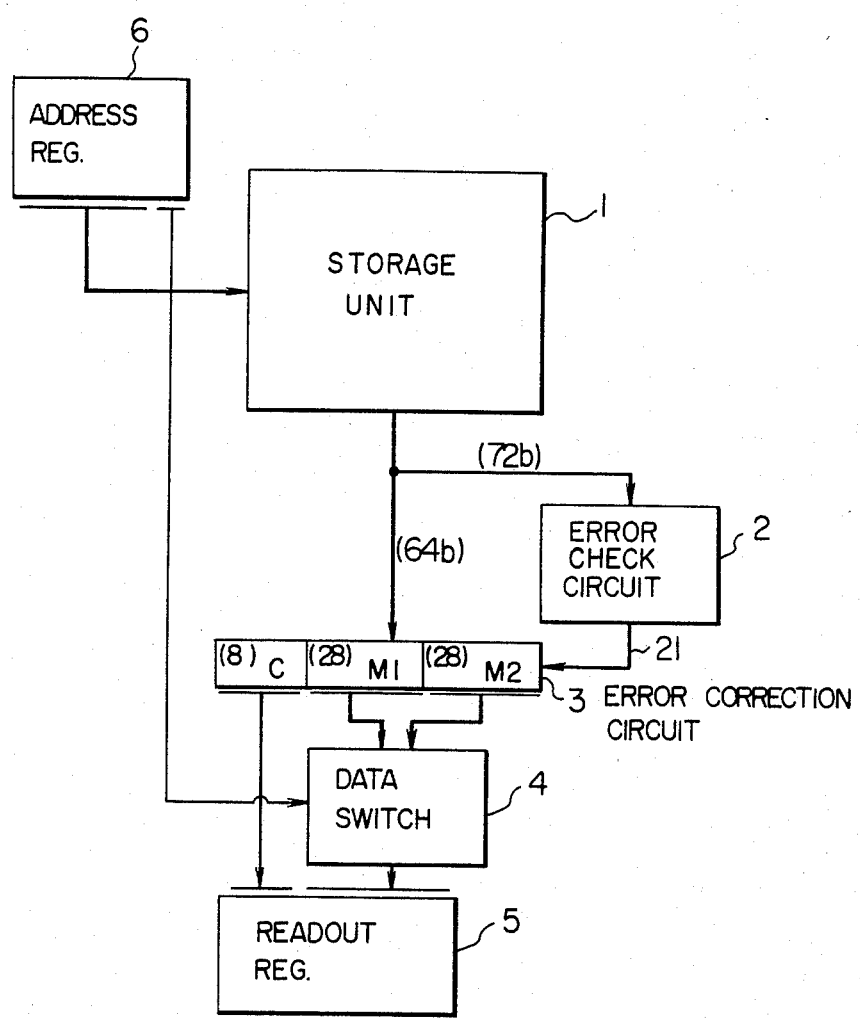
FIG. 2 is a schematic block diagram of the control storage CS in accordance with one embodiment of the present invention.

FIG. 2 shows a block diagram of one embodiment of the control storage CS of the present invention. Numeral 1 denotes a storage unit which contains several thousands of words each being formed in the manner described above. A word specified by the bits excluding the least significant bit of an address register 6 is read from the storage unit 1 and the 72 bits thereof are checked by an error check (detection) circuit 2. If an error is detected, an error correction signal 21 is sent to an error correction circuit 3. The error correction circuit 3 receives the 64 bits of the readout word excluding the check bits ECC, and if the error correction signal 21 is present, it inverts the error bit to correct the data. While the error check circuit 2 and the error correction circuit 3 are separated in the illustrated embodiment, they may be combined. The error check circuit 2, the error correction circuit 3 and the error check/correction circuit may be formed of those circuits well known in the art.

Of the corrected 64-bit data, the field C which is common to the two microinstructions is loaded into a readout register 5. As to the remaining 56 bits, the 28-bit sector M1 or the 28-bit sector M2 is selected by the least significant bit of the address register 6 and it is loaded into the readout register 5. It is apparent from the explanation for FIG. 1 that the content of the readout register 5 forms one microinstruction. The microinstruction thus formed is decoded by a decoder (not shown) to produce a signal to control the units of the data processing system.

According to the present invention, since selected fields of the microinstruction are commonly used by the two microinstructions and stored in the control storage CS, the capacity of the control storage CS can be reduced. Accordingly, an economic ECC operation is attained and reliability of the control storage CS is remarkably improved. That is, in the case of generally-used ECC for one-bit error correction and two-bit error detection, the addition of eight-bit ECC bits to 64-bit data is the most economic way of ECC operation. In addition, since selected fields of the microinstruction are commonly used by the two microinstructions and stored in the control storage CS, the capacity of the control storage CS can be reduced.

While the illustrated embodiment includes two microinstructions in one word, more than two microinstructions may be included. In this case, the number of bits supplied from the address register 6 to the data switch 4 increases.

While the storage for the microinstructions has been described in the illustrated embodiment, it should be understood that the present invention is equally applicable to the storage of macroinstructions.

What is claimed is:

1. An instruction storage for a data processing system comprising storage means for storing a plurality of words, each word in said storage means including a plurality of multi-field instructions and having a first data field including a plurality of data areas, each said data area including those fields of a respective one of said plurality of multi-field instructions which are not identical in all of said instructions, and a second data field including a single data area for fields of the plurality of instructions which are identical in all of said plurality of multi-field instructions;

instruction designation means connected to said storage means for designating one of said words to be read from said storage means by generation of an address including a first designation field for designating a word in said storage means and a second designation field for designating one of the data areas of the first data field of said word, including means for applying said first designation field of said address to said storage means to read out said designated word;

readout data store means connected to said storage means for temporarily storing the word designated by said first designation field of said address generated by said instruction designation means and read out of said storage means;

selection means connected to said instruction designation means for selecting and reading out said designated one of the data areas of said first data field in the word stored in said readout data store means in response to said second designation field of said address generated by said instruction designation means; and means connected to said readout data store means and said selection means for forming an instruction based on the second data field in the word read from said readout data store means and the output of said selection means.

2. An instruction storage for a data processing system comprising storage means for storing a plurality of words, each word in said storage means including a plurality of multi-field instructions and having a first data field including a plurality of data areas, each said data area including those fields of a respective one of said plurality of multi-field instructions which are not identical in all of said instructions, and a second data field including a single data area for fields of the plurality of instructions which are identical in all of said plurality of multi-field instructions;

instruction designation means connected to said storage means for designating one of said words to be read from said storage means by generation of an address including a first designation field for designating a word in said storage means and a second designation field for designating one of the data areas of the first data field of said word, including means for applying said first designation field of said generated address to said storage means to read out said designated word;

selection means connected to said instruction designation means for selecting said designated one of the data areas of said first data field in the word read out from said storage means as designated by said second designation field of said generated address; and means connected to said storage means and said selection means for forming an instruction based on the second data field in the word read from said storage means and the output of said selection means.

3. An instruction storage according to claim 1 or claim 2, wherein said instructions are microinstructions of a microprogram.

4. An instruction storage according to claim 1 or claim 2, wherein said instructions are macroinstructions of a macroprogram.

5. An instruction storage according to claim 1 or claim 2, characterized in that each word in said storage means includes error check and correction bits for determining errors in the word.

6. An instruction storage according to claim 1 or claim 2, characterized in that said instruction designation means comprises an address register for storing a plurality of addresses and means for reading out said addresses, and said first designation field and said second design tion field are a high order bit field and a low order bit field of the address read out of said address register, respectively.

7. A method of storing a large number of instructions in a storage unit of limited capacity in a data processing system, comprising the steps of:

forming a word consisting of a first word data field made up of those fields of a plurality of multi-field instructions which are identical in the respective instructions and a second word data field made up of a plurality of respective data areas each including the remaining non-identical fields of a respective one of said plurality of multi-field instruction; and storing said word in a storage unit of a data processing system at a storage location therein designated by a storage address which forms a first designation field of a designation address having a second designation field which identifies the relative location of a data area of said word with respect to said storage address.

8. A method of storing according to claim 7, wherein each word is formed to include a third data field including a plurality of error check and correction bits for determining errors in the word.

9. A method of storing instructions in a data processing system, comprising:

storing a plurality of words in a storage unit, each word including a plurality of multi-field instructions and having a first data field including a plurality of data areas, each said data area including those fields of a respective one of said plurality of multi-field instructions which are not identical in all of said instructions, and a second data field including a single data area for fields of the plurality of instructions which are identical in all of said plurality of multi-field instructions;

designating one of said stored words to be read out of said storage unit by generation of an address including a first designation field for designating said one stored word and a second designation field for designating one of the data areas of the first data field of said one stored word, including applying said first designation field of said address to said storage unit to read out said one stored word designated by said generated address;

temporarily storing said word designated by said first designation field of said generated address and read out of said storage unit;

selecting the one of the data areas of said first data field in the temporarily stored word designated by said second designation field of said generated address; and forming an instruction based on the second data field in the temporarily stored word and the selected one of the data areas of the first data field in the temporarily stored word.

10. A method of storing instruction in a data processing system, comprising:

storing a plurality of words in a storage unit, each word including a plurality of multi-field instructions and having a first data field including a plurality of data areas, each said data including those fields of a respective one of said plurality of multi-field instructions which are not identical in all of said instructions, and a second data field including a single data area for fields of the plurality of instructions which are identical in all of said plurality of multi-field instructions;

designating one of said words to be read from said storage unit by generation of an address including a first designation field for designating said one stored word in said storage means and a second designation field for designating one of the data areas of the first data field of said one stored word, including applying said first designation field of said generated address to said storage unit to read out said one stored word designated by said generated address;

selecting one of the data areas of said first data field in said one stored word read out from said storage unit as designated by said second designation field of said generated address; and forming an instruction based on the second data field in said one stored word read from said storage unit and the selected data area of the first data field of said one stored word.

11. A method of storing according to claim 9 or claim 10, wherein each word stored in said storage unit is formed to include a third data field including a plurality of error check and correction bits for determining errors in the word.

* * * * *